United States Patent
Brenner

(10) Patent No.: US 8,586,232 B2
(45) Date of Patent: Nov. 19, 2013

(54) BUTTON CELL WITHOUT FLANGING AND METHOD OF MAKING SAME

(75) Inventor: Rolf Brenner, Ellwangen (DE)

(73) Assignee: Varta Microbattery GmbH (DE)

( * ) Notice: Subject to any disclaimer, the term of this patent is extended or adjusted under 35 U.S.C. 154(b) by 0 days.

(21) Appl. No.: 13/262,862

(22) PCT Filed: Mar. 16, 2010

(86) PCT No.: PCT/EP2010/053367
§ 371 (c)(1),
(2), (4) Date: Oct. 20, 2011

(87) PCT Pub. No.: WO2010/112332
PCT Pub. Date: Oct. 7, 2010

(65) Prior Publication Data
US 2012/0028110 A1 Feb. 2, 2012

(30) Foreign Application Priority Data
Apr. 4, 2009 (DE) .......................... 10 2009 017 514

(51) Int. Cl.
*H01M 2/02* (2006.01)
*H01M 2/04* (2006.01)
*H01M 10/04* (2006.01)

(52) U.S. Cl.
USPC ............................. 429/174; 429/164; 429/185

(58) Field of Classification Search
USPC ....................................................... 429/174
See application file for complete search history.

(56) References Cited

U.S. PATENT DOCUMENTS

| 4,220,695 A | 9/1980 | Ishida et al. |
| 4,321,316 A * | 3/1982 | Kuhl ............................ 429/174 |
| 4,487,819 A | 12/1984 | Koga |
| 6,066,184 A | 5/2000 | Brenner |
| 6,245,452 B1 | 6/2001 | Oltman |
| 2009/0325062 A1 | 12/2009 | Brenner et al. |
| 2011/0200871 A1 | 8/2011 | Pytlik et al. |

FOREIGN PATENT DOCUMENTS

| DE | 29 23 688 A1 | 1/1980 |
| DE | 31 13 309 A1 | 10/1982 |
| DE | 32 47 191 A1 | 7/1983 |
| DE | 196 47 593 A1 | 5/1998 |
| DE | 696 03 653 T2 | 4/2000 |
| DE | 10 2008 018 172 A1 | 10/2009 |
| GB | 2 110 464 A | 6/1983 |
| JP | 58-42167 A | 3/1983 |
| WO | 2007/062838 A1 | 6/2007 |
| WO | 2009/121577 A1 | 10/2009 |

\* cited by examiner

*Primary Examiner* — John S Maples
(74) *Attorney, Agent, or Firm* — DLA Piper LLP (US)

(57) ABSTRACT

A method for producing a button cell with a housing includes a cell cup with a base region, a lateral region, an edge region lying therebetween and a cut edge, and a cell cover with a cover region, a lateral region, an edge region lying therebetween and a cut edge, connected to one another via a seal. The method includes at least applying the seal to the lateral region, inserting the cell cover with the seal into the cell cup, wherein a region is formed in which the lateral regions and overlap one another, and exerting a pressure on the lateral region of the cell cup. The heights of the lateral regions and are matched to one another such that the cut edge is pressed against the lateral region by pressure. The cell cup of button cells have an inner radius which is essentially constant in the region in the direction of the cut edge.

11 Claims, 2 Drawing Sheets

BUTTON CELL WITHOUT FLANGING AND METHOD OF MAKING SAME

RELATED APPLICATIONS

This is a §371 of International Application No. PCT/EP2010/053367, with an international filing date of Mar. 16, 2010 (WO 2010/112332 A1, published Oct. 7, 2010), which is based on German Patent Application No. 10 2009 017 514.8, filed Apr. 4, 2009, the subject matter of which is incorporated by reference.

TECHNICAL FIELD

This disclosure relates to button cells having a housing comprising a cell cup and a cell over which are connected to one another via a seal, and to a method for producing such cells.

BACKGROUND

Button cells normally have a housing comprising a housing cup (often also referred to as a housing pan) and a cell cover. By way of example, the cell cup and the cell cover may be produced from nickel-plated deep-drawn metal sheet as a stamped drawn part. Usually the cell cup is of positive polarity and the cell cover is of negative polarity. The housing may contain widely different electrochemical systems, for example, zinc/$MnO_2$, primary or secondary lithium-systems or secondary systems like nickel/cadmium or nickel/metal hydride.

Button cells are normally closed in a liquid-tight manner by flanging the edge of the cell cup around the edge area of the cell cover in conjunction with a plastic ring arranged between the cell cup and the cell cover and at the same time acts as a sealing element as well as providing isolation between the cell cup and the cell cover. By way of example, such button cells are disclosed in DE 31 13 309.

DE 196 47 593 describes button cells in which the plastic ring is replaced by a sealing element produced by thermoforming from a film. Compared to classical seals produced by injection molding, the described film seals have the advantage that they can be produced having a comparatively low thickness and therefore a relatively small volume. Film seals make it possible to produce button cells having notably improved capacity.

All these button cells have in common that during their assembly problems may arise as a result of comparatively low thicknesses of the walls of the cell cup and the cell cover as this may lead to deformations when a mechanical load is applied. Critical are in particular loads applied during the flanging process. The goal of the flanging is to provide a form-fitting connection between the cell cup and the cell cover. During the flanging the cut edge of the cell cup is bent radially inward over the edge of the cell cover. The seal between the cell cup and the cell cover is thereby compressed. During this process axial loads arise which may lead to deformation or even breakdown of the base of the cell cup and the cell cover. As long as the mechanical load on the cup and the cover is not distributed evenly, damage of the cell cup and/or the cell cover can occur and, as a consequence, leaks may result.

It could therefore be helpful to provide a technical solution which does not suffer from such problems. In particular, it could be helpful to provide a new method for producing button cells, wherein the housing parts to be assembled are exposed to mechanical loads in the axial direction as low as possible. Thus, the button cells should be produced by a construction as simple as possible and, simultaneously, by good leak-tightness properties and a high capacity.

SUMMARY

I provide a method for producing a button cell with a housing including a cell cup with a base region, a lateral region, an edge region lying therebetween and a cut edge, and a cell cover with a cover region, a lateral region, an edge region lying therebetween and a cut edge connected to one another via a seal, including the steps of applying the seal to the lateral region of the cell cover, pushing the cell cover with the seal into the cell cup to form a region in which the lateral regions overlap one another, and exerting pressure on the lateral region of the cell cup to seal the housing, wherein heights of the lateral regions are matched to one another such that the cut edge is pressed against the lateral region by the pressure.

I also provide a button cell with a housing including a cell cup and a cell cover connected to one another via a seal, wherein the cell cup includes a base region, a lateral region, an edge region lying therebetween and a cut edge, the cell cover includes a cover region, a lateral region, an edge region lying therebetween and a cut edge, the cell cover is inserted into the cell cup such that the lateral regions overlap in selected regions, and an internal radius of the cell cup is essentially constant in the region in a direction of the cut edge.

DETAILED DESCRIPTION

Figure 1A:
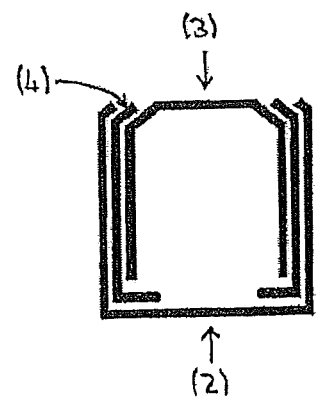
FIG. 1 schematically shows a cross-section of the housing of an example of my button cell and, in comparison thereto, the housing of a classical button cell with flanged cut edge.

My methods comprise the step of connecting a cell cup and a cell cover with each other over a seal. Combined, the cell cup and the cell cover form a housing which offers space for standard components of a button cell like electrodes, separator and so on.

The cell cups and cell covers used in the method regularly each respectively have a base region/a cover region, a lateral region, an edge region lying between the base region/the cover region and the lateral region and a cut edge.

The base region and the cover region are essentially flat, regularly they serve as poles at which electricity is charged by a consumer load. In the final button cell (produced according to my method), the base region and the cover region of the cell cup and the cell cover are arranged essentially in parallel to one another. In contrast, the lateral regions of the cell cup and the cell cover are arranged essentially orthogonally to the base region and the cover region in the final button cell and have an essentially cylindrical geometry. Preferably, the internal and the external radius of the cell cup and the cell cover are essentially constant in the lateral regions.

The edge regions of the cell cup and the cell cover form the transition between the lateral regions and the base region or the cover region. They are preferably confined on the one hand by the essentially flat base and cover regions and on the other hand by the essentially cylindrical lateral regions arranged orthogonally thereto. By way of example, the edge areas may be in the form of a sharp edge or else may be rounded.

Regularly, a seal is applied to the lateral region of the cell cover in a first step.

In a further step, the cell cover is then inserted with the seal applied into a cell cup such that a region is formed in which the lateral regions of the cell cup and the cell cover overlap one another. The size of the overlapping region and the ratio of the overlapping region to non-overlapping areas are governed by the respective height of the lateral regions of the cell cup and the cell cover and by the depth of the insertion.

With regard to the lateral region of the cell cover, it is preferable for between 20% and 99%, in particular between 30% and 99%, particularly preferably between 50% and 99%, to overlap with the lateral region of the cell cup (the percentages each relate to the height of the lateral region).

Prior to insertion, the other standard components of a button cell (electrodes, separator, electrolyte and so on) are placed into the housing cup and/or the housing cover.

After the cell cover has been inserted completely into the cell cup, pressure is exerted on the lateral region of the cell cup, in particular, in the area of the cut edge to seal the housing. The combined housing parts should, as far as possible, not be subjected to any loads or only to very small loads in the axial direction. Therefore, the pressure is applied in particular radially. Thereby the external diameter of the cell housing can be calibrated, besides the sealing of the housing, which has already been mentioned.

The heights of the lateral regions of the cell cup and the cell cover are matched to one another such that the cut edge of the cell cup is pressed against the lateral region of the cell cover by the pressure on the lateral region of the cell cup. The heights of the lateral regions are therefore preferably chosen such that it is not possible to bend the cut edge of the cell cup around inward over the edge area of the cell cover which is completely inserted into the cell cup. Thus, there is no flanging of the edge of the cell cup over the edge area of the cell cover.

As a consequence, the cell cup of a button cell has a lateral region with an essentially constant radius in the direction of the cut edge.

Surprisingly, I found that the flanging is not mandatorily necessary to provide leak tightness and integrity of housings comprising a cell cup and a cell cover. According to my method, button cells having an outstanding leak tightness can be produced without flanging.

In the case of button cells produced according to my method, there exists preferably only a force-fitting connection between the housing components cell cup, cell cover and seal. This ensures that the components preferably are held together essentially only by static friction force.

Particularly preferably, a cell cup is used which is conical at least in one part of its lateral region such that at least its internal diameter increases in the direction of the cut edge. This makes it considerably easier to insert the cell cover into the cell cup. The dimensions of the cell cup and the cell cover are preferably matched to one another such that relatively large opposing forces preferably do not arise until the cover is inserted virtually completely into the cup. Preferably, the cone angle is between 10 min and 3°, in particular, between 30 min and 1° 30 min.

Preferably, the cell cover with the applied seal, which is inserted into the cell cup, is cylindrical at least in a part of the lateral region. This may relate in particular to that part of the lateral region which overlaps with the conical part of the lateral region of the cell cup, after the cell cover has been inserted into the cell cup. The lateral region of the cell cover is particularly preferably entirely cylindrical. The cell cover therefore preferably has a constant external radius in the lateral region. This may relate in particular to that part which overlaps the conical part of the lateral region of the cell cup after the cell cover has been inserted.

When a cell cover with a cylindrical lateral region is inserted into a cell cup which is conical at least in a part of its lateral region, as has been described above, usually a gap is created between the cell cup and the cell cover which opens upwardly. Usually this gap is closed by the pressure on the lateral region of the cell cup. If applicable, the pressure on the lateral region of the cell cup may be chosen such that the conical part of the lateral region of the cell cup is pressed inward, up to the point when the inside of the cell cup and the outside of the cell cover are essentially at the same distance from one another in the overlapping area. The resulting button cell has lateral regions which are aligned parallel to one another, in particular, in the overlapping area.

An import aspect is the choice of the seal which connects the cell cup to the cell cover. The seal is preferably a plastic seal consisting of a thermoplastic.

The plastic seal is particularly preferably a film seal, for example, as is described in DE 196 47 593, in particular a film seal consisting of a thermoplastic.

It is possible to produce film seals having a greatly uniform thickness. When suitable pressure is applied to the lateral region of the cell cup, this results in an interference fit, as a consequence of which the produced button cell has excellent leak-tightness properties. The use of film seals obviates the need for the edge of the cell cup being flanged without this on the other hand resulting in a need to accept disadvantages in other important characteristics.

It is particularly preferable to use plastic seals, in particular plastic films, based on polyamide or based on polyether ether ketones.

It is preferred that the seal has an initial thickness in the range between 50 μm and 250 μm, particularly preferably between 70 μm and 150 μm, in particulary of about 100 μm. The term "initial thickness" is intended to mean the thickness of the seal before it is applied to the lateral region of the cell cover. In contrast to this, the term "final thickness" is intended to mean the thickness of the seal in the finished cell. It is clear that, at least in the overlapping area, this generally corresponds to the distance between the inside of the cell cup and the outside of the cell cover.

To allow a sufficiently large amount of friction to be formed between the cell cup and the cell cover, both the external and internal radii of the cup and the cover should be matched to one another and to the thickness of the film seal. This is the only way to create a sufficiently high contact pressure to hold the two individual parts together.

It is preferable for the parts used in the method that the difference between the external radius of the cell cover, which is to be inserted into the cell cup, on the cut edge of the cell cover, and the smallest internal radius of the cell cup in that part of the lateral region, which overlaps with the lateral region of the cell cover, is less than the initial thickness of the seal that is used. The difference is particularly preferably between 10% and 90% of the initial thickness, in particular between 30% and 70%, and particularly preferably about 50%.

Particularly preferably, a part of the lateral region of the cell cup is drawn radially inward after the cell cover has been inserted into the cell cup. This relates in particular to that part of the lateral region which does not overlap the lateral region of the cell cover.

I found that this process of drawing-in makes it possible to achieve considerably better leak-tightness properties. Drawing the lateral region of the cup inward results in a radial pressure on the edge section abutting to the inside of the housing cup and on the seal which is arranged between the housing cover and the housing cup, with the seal in consequence being compressed in this section.

The process of drawing-in can be carried out at the same time as the exertion of pressure on the lateral region of the cell cup, although the process of drawing-in is preferably carried out in subsequent, separate step.

The button cell has a housing comprising a cell cup and a cell cover. The cell cup and the cell cover are connected to one another via a seal. The cell cup comprises a base region, a lateral region, an edge region lying therebetween and a cut edge. The cut edge forms the boundary of the opening of the cell cup. The same applies to the cell cover which comprises a cover region, a lateral region as well as an edge region lying therebetween and a cut edge.

The button cell can be produced in particular according to the above described method. Accordingly, the information given to the components used in the scope of the method (cell cup, cell cover, seal) as well as to the characteristics of the final button cell produced according to a method applies to the button cell which is described as follows.

The button cell has a cell cover inserted into the cell cup such that the lateral regions of the cell cover and the cell cup overlap, wherein the internal radius of the cell cup in the overlapping area is essentially constant in the direction to the cut edge. Accordingly, the button cell does not comprise a cup with an edge which is flanged, unlike known button cells. The button cell is closed without flanging.

This has different advantages. Essentially only radial forces are needed to close and seal the button cell, whereas axial forces, by which the cell cup and the cell cover can be deformed easily, as described above, hardly ever occur. This facilitates process control during the production significantly. Further, it is possible to use cell cups with a comparatively short lateral region as it is not necessary that the lateral region of the cell cups rises up the edge region of the cell cover. This results in significant material savings and therefore represents a cost benefit.

As already indicated above, it is preferred that in the axial direction there is no form-fitting connection between the cell cup and the cell cover. In contrast, it is preferred that the cell cup and the cell cover are held together in the axial direction only by a force-fitting connection.

It is preferred that the cut edge of the cell cup abuts in the lateral region of the cell cover. Preferably, the heights of the lateral regions of the cell cup and the cell cover are matched to one another such that by radial pressure it is only possible to press the cut edge against the lateral region of the cell cover. This ensures that the cut edge which forms the boundary of the opening of the cell cup is not bent around inwardly by the pressure applied during production of the button cell.

It is particularly preferred that the inside of the cell cup and the outside of the cell cover are essentially at the same distance from one another in the overlapping area. This applies in particular when the internal and the external radius of the cell cover are constant in the direction of cut edge of the cell cover or, in other words, when the cell cover is single-walled and cylindrical in the lateral region.

In this case, the button cell preferably comprises a supporting ring onto which the cut edge of the cell cover can rest when it is inserted into the cell cup completely.

Certainly, it is further possible that the cut edge of the cell cover of a button cell is bent around radially outward or radially inward. Housing covers with a double-walled lateral region produced by bending around the edge are known, for example, from DE 196 47 593. The use of such housing covers ensures a high stability. Further, there are no sharp edges in the edge area and the area of support of such housing covers is significantly increased in comparison to classical housing covers. Accordingly, a support ring is not needed.

On the other side, the use of double-walled housing covers has a negative effect on the internal volume available in a cell. It is therefore not unusual to bend around the edge of a cell cover of a button cell only in the edge section.

Particularly preferably, at least the part of the lateral region of the cell cover being in close distance to the base region of the cell cup has an essentially L-shaped cross section. The part of the lateral region of the cell cover which is bent around with the cut edge of the cell cover is preferably arranged essentially orthogonally to areas of the edge section which are not bent around, that is to say bent outwards or inwards, starting from these, through about 80° to 100°, preferably about 85° to 95°, in particular about 90°. Such a cell cover is disclosed, for example, in FIG. 2 of WO 2007/062838.

Further preferably, at least the part of the lateral region of the cell cover of a button cell being at a close distance to the base region of the cell cup has an essentially U-shaped cross section. In this instance, the part of the lateral region of the cell cover which is bent around with the cut edge of the cell cover is bent around outward or inward as far as that the bent-around part is aligned essentially parallel to areas of the edge sections which have not been bent around. Starting from these, it is bent around outwards or inwards through about 180° such that it is also possible to refer to this as a swaged edge. Such a cell cover is disclosed, for example, in FIG. 7 of WO 2007/062838.

In instances in which the cut edge of the cell cover is bent around radially outward, it is preferred that the cut edge or the part of the lateral region bent around together with the cut edge is drawn radially inward. This applies both in the case of cell covers with an edge being bent around outwardly in an L-shape and in a U-shape. In this instance, the cut edge of the cell cover preferably has a radius equal to or smaller than the external radius of the part of the lateral region of the cover which is not bent around.

It may also be preferred for the external diameter of the part of the lateral region of the cell cover which is not bent around to be less than the radius of the cut edge. This can be advantageous, in particular, with respect to the leak tightness of a button cell. The difference between the radii is preferably less than 50% of the wall thickness of the housing cover in this instance.

It is particularly preferred that no more than 50% of the lateral region of the cell cover (referring to its overall height) are bent around outwardly or inwardly. Particularly preferred are less than 25%, in particular less than 10%.

With respect to the distance between the inside of the cell cup and the outside of the cell cover of a button cell, it is preferred that it is between 10 µm and 75 µm, in particular between 30 µm and 50 µm in the area of the overlapping of the lateral region of the cell cup and the lateral region of the cell cover. As already discussed above, the distance between the inside of the cell cup and the outside of the cell cover corresponds essentially to the "final thickness" of the seal in the overlapping area.

Preferably, cell cups are used with a wall thickness between 30 µm and 150 µm. Within this range values between 70 µm and 100 µm are particularly preferred.

The cell cover has similar properties. It is used preferably with a wall thickness between 50 µm and 200 µm, in particular between 100 µm and 130 µm.

It is particularly preferred that the cell cup and/or the cell cover of a button cell consist of a metal, in particular of trimetal with the sequence nickel, steel and copper. Of course, the initially mentioned deep-drawn metal sheet may be used, too.

Particularly preferably, at least a part of the lateral region of the cell cup which does not overlap the lateral region of the cell cover is drawn inward radially. The external radius of this part of the lateral region is consequently smaller than the external radius of the lateral region in the overlapping area. As already mentioned above, by this indent an improved leak tightness may be achieved. The difference between the external radii is preferably smaller than the distance between the inside of the cell cup and the outside of the cell cover in the overlapping area.

The stated advantages and further advantages will become evident from the description of the drawings which now follows. In this case, the individual features may be implemented on their own or in combination with one another. The described examples are intended only for explanation and for better understanding and should in no way be understood as being restrictive.

Figure 1B:
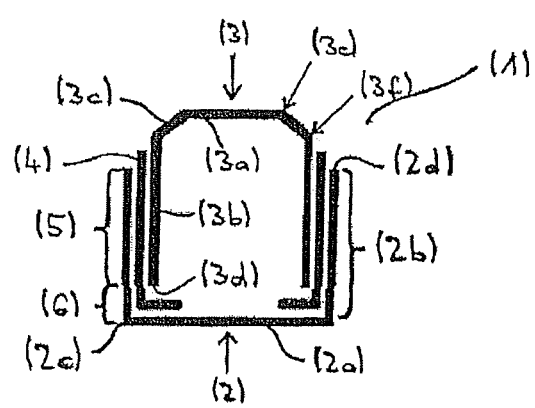

In FIG. 1 the housing 1 of my button cell (B) and that of a classical button cell (A) with the edge of the cell cup being flanged are presented. The housing of the classical button cell as well as that of my button cell are each assembled of a cell cup 2 and a cell cover 3. In both cases these are connected to one another by a seal 4. In the case of the classical button cell the opening edge of the cell cup 2 is bent around inwardly over the edge of the cell cover 3, whereas this is not the case in my button cell.

It is easily recognized that in the case of housing 1 of my button cell the lateral regions 2b and 3b of the cell cover 3 and the cell cup 2 overlap, resulting in the overlapping area 5. The internal radius of the cell cup 2 in the overlapping area 5 is essentially constant up to the cut edge 2d. Thus, the housing 1 of my button cell does not have a cut edge bent around inwardly as it is the case for the classical button cell (A). The cut edge 2d of the cell cup 2 abuts on the outside of the lateral region 3b of the cell cover 3.

The cell cup 2 comprises the essentially plane base region 2a, the essentially cylindrical lateral region 2b and the edge region 2c. The cut edge 2d forms the opening edge of the cell cup 2.

The cell cover 3 comprises the essentially plane cover area 3a, the essentially cylindrical lateral region 2b and the edge region 3c. The cut edge 3d forms the opening edge of the cell cover 3.

The edge region 2c has the form of a sharp edge wherein the edge region 3c is a comparatively flattened conjunction between the cover region 3a and the lateral region 3b. In the case of classical button cells such a flattened conjunction is needed to allow the edge of the cell cup 3 being bent around inwardly. My button cell obviates the need for this. Consequently, it is possible to design the region 3c as a sharp edge, too. The edge area 3c is confined on the one side along the line 3e by the essentially plane cover region 3a and to the other side along the line 3f by the surrounding, essentially cylindrical lateral region 3b, which is arranged orthogonally to the essentially plane cover region 3a.

Further, the region 6 is presented, in which the lateral region 2b of the cell cup 2 which does not overlap with the lateral region 3b of the cell cover is drawn radially inwards. The external radius of the lateral region of the cell cup 2 is consequently smaller in the area 6 than the external radius of the lateral region in the overlapping area 5.

Figure 2:
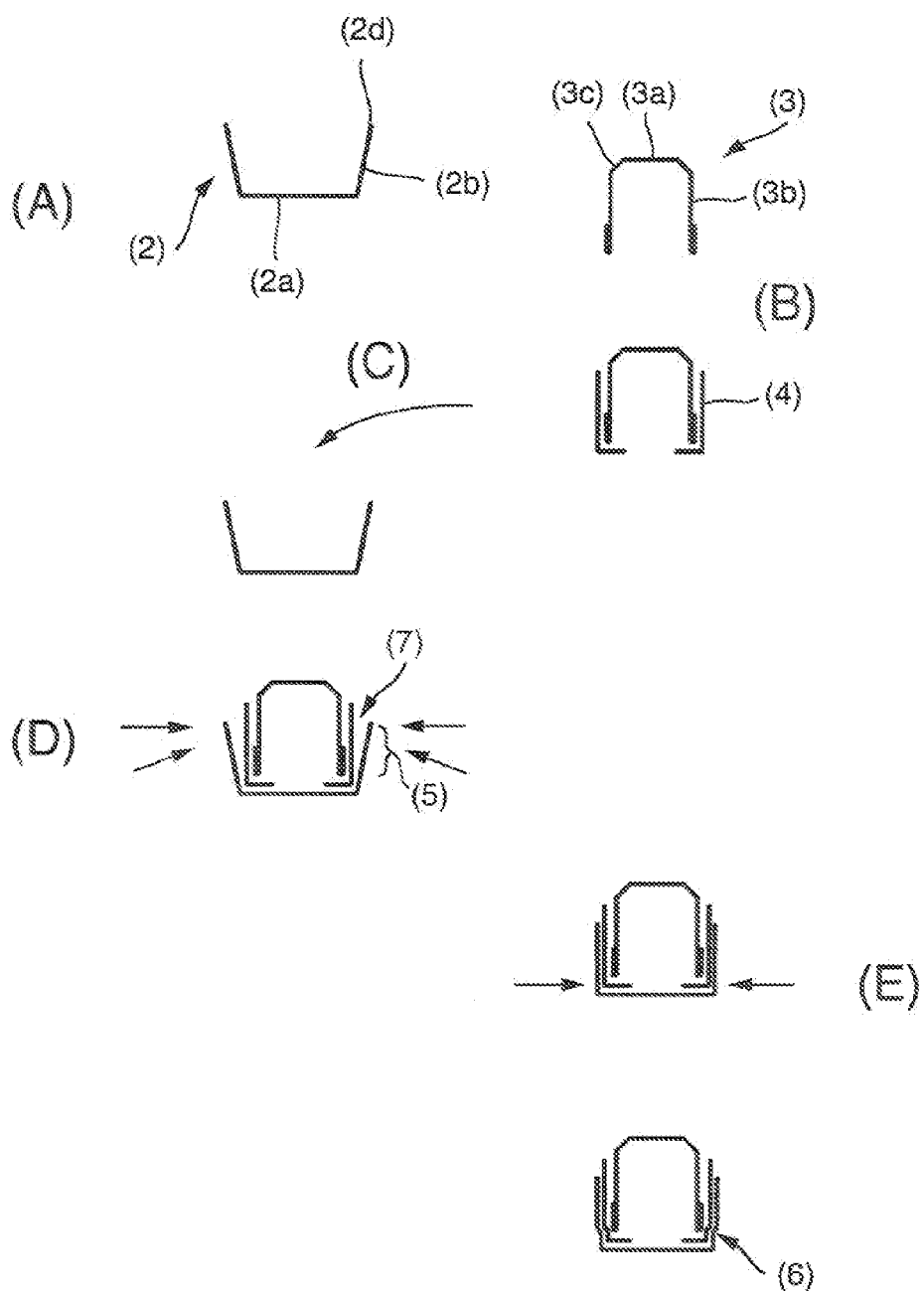
FIG. 2 illustrates the method for producing my button cell.

In FIG. 2 the essential steps of my method are presented (steps A to E). In step A a cell cup 2 and a cell cover 3 are provided. The cell cup 2 comprises a plane base region 2a as well as a lateral region 2b. The lateral region 2b is conical, wherein the cone angle exceeds the above mentioned preferred values significantly for the purpose of demonstration. The cut edge 2d forms the opening edge of the cell cup 2 and accordingly confines the lateral region on one side. On the other side, the lateral region 2b is confined by the edge region 2c, which is in the present case in the form of a sharp edge. The cell cover 3 comprises a cover region 3a and a lateral region 3b. Similar to the base region 2a the cover region 3a is essentially plane. In contrast to the conical lateral region of the cell cup 2, the lateral region 3b has an essentially cylindrical geometry. The lateral region 3b is confined, in analogy to the lateral region 2b, on one side by the cut edge 3d which forms the opening edge of the cover and on the other side by the edge region 3c. In this case, the edge region 3c is not in the form of a sharp edge as it is the case, for example, for the cell cup 2.

In step B a seal is applied to the lateral region 3b of the cell cover 3, in particular a film seal 4. The seal may be, by way of example, a shrink film that can be shrunk onto the lateral region 3b. It is clearly recognizable that the seal extends nearly up to the edge region 3c wherein it is turned over inwardly around the cut edge 3d of the cell cover 3 in the lower section.

In step C the cell cup 3 with the applied seal 4 is put or inserted into the cell cup 2. From this an assembled unit results having a gap 7 between the outside of the cell cover 3 and the inside of the cell cup 2. The lateral region 3b of the cell cover and the lateral region 2b of the cell cup overlap in the region 5.

In step D the lateral region 2b and along with it the cut edge 2d are pushed inwardly by radial forces such that the gap 6 is closed. A button cell results having lateral regions 3b and 2b arranged in parallel to one another and which are essentially the same distance from one another in the overlapping area 5.

In a last optional step E, a part of the lateral region 2b of the cell cup 2 is drawn inward radially. In particular, this applies to the part of the cell cup 2, which does not overlap with the lateral region 3b to the region 5. The process of drawing-in results in the indent 6. In the area which is drawn in, the seal 4 is pressed against the cut edge 3d or the opening edge of the cell cover 3. This improves the leak tightness of the resulting button cell significantly.

The invention claimed is:

1. A button cell with a housing and without flanging comprising: a cell cup and a cell cover connected to one another via a thermoplastic film seal, wherein the cell cup comprises a base region, a lateral region, an edge region lying therebetween and a cut edge, the cell cover comprises a cover region, a lateral region, an edge region lying therebetween and a cut edge, the cell cover is inserted into the cell cup such that within an overlapping area between 20 and 99% of the lateral region of the cell cup overlap with the lateral region of the cell cover, and an internal radius of the cell cup is constant in the overlapping area in a direction of the cut edge, and wherein at least a part of the lateral region of the cell cup which does not overlap the lateral region of the cell cover is drawn radially inwardly such that an external radius of this part of the lateral region of the cell cup is smaller than an external radius of the lateral region of the cell cup in the overlapping area.

2. The button cell according to claim 1, wherein the cell cup and the cell cover are connected exclusively via a force-fitting connection.

3. The button cell according to claim 1, wherein the cut edge of the cell cup abuts in the lateral region of the cell cover.

4. The button cell according to claim 1, wherein inside of the cell cup and outside of the cell cover are essentially at the same distance from one another in the overlapping area.

5. The button cell according to claim 1, wherein the cut edge of the cell cover is bent around radially outwardly.

6. The button cell according to claim 1, wherein a distance between inside of the cell cup and outside of the cell cover in the overlapping area is between 10 μm and 75 μm.

7. The button cell according to claim 1, wherein the thermoplastic film seal comprises polyamide or polyetheretherketone.

8. The button cell according to claim 1, wherein the cell cup has a wall thickness of 30 μm to 150 μm.

9. The button cell according to claim 1, wherein the cell cover has a wall thickness of 50 μm to 200 μm.

10. The button cell according to claim 1, wherein the cell cup and the cell cover consist of a trimetal with a sequence nickel, steel and copper.

11. The button cell according to claim 1, wherein a difference between an external radii is less than a distance between inside of the cell cup and outside of the cell cover in the overlapping area.

* * * * *